UNITED STATES PATENT OFFICE.

JULIUS HERBABNY, OF OFFENBACH-ON-THE-MAIN, GERMANY, ASSIGNOR TO FIRM OF K. OEHLER, ANILIN- & ANILINFARBEN-FABRIK, OF SAME PLACE.

BLUE TRIAZOL DYE AND PROCESS OF MAKING SAME.

SPECIFICATION forming part of Letters Patent No. 670,398, dated March 19, 1901.

Application filed February 6, 1900. Serial No. 4,226. (Specimens.)

*To all whom it may concern:*

Be it known that I, JULIUS HERBABNY, chemist, doctor of philosophy, residing at Biebererstrasse 32, Offenbach-on-the-Main, in the Grand Duchy of Hesse, Germany, have invented new and useful Improvements in Blue Triazol Dyes, of which the following is a specification.

In the German Patent No. 107,498 a process is described for the transformation of the coloring-matter sulfanilic acid-azo-amido-R-salt into a triazol trisulfonic acid which may be converted into a dioxy triazol mono sulfonic acid of the formula:

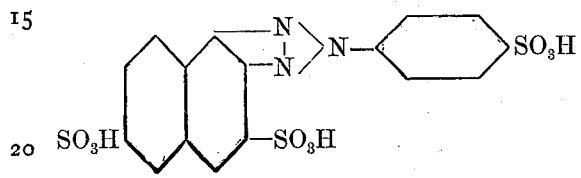

by melting it during five hours with the triple quantity of sodium lye of sixty per cent. at 230° centigrade. This acid, combined with diazo compounds, yields valuable coloring-matters. By the action of the tetrazo compounds of para-diamins upon the dioxy triazol mono sulfonic acid either so-called "intermediate" products or tetrazo dyestuffs will be obtained, according to the molecular proportions used. The dioxy triazol mono sulfonic acid may also easily be combined with those intermediate products which are formed from the tetrazo compounds of para-diamins and amins, phenols, amidophenols, their sulfonic or carboxylic acids, thus yielding tetrazo dye-stuffs. A valuable coloring-matter of this series results when the intermediate product obtained in an alkaline solution from one molecule of the tetrazo compound of a para-diamin and one molecule of the 1.8-amido-naphthol-3.6-disulfonic acid is combined with one molecule of the above-mentioned dioxy-triazolmonosulfonic acid.

The following example will illustrate the manner in which my invention may be carried out. The parts are by weight:

Prepare in the usual way an intermediate product in soda alkaline solution from 21.2 parts of tolidin (or the equimolecular proportion of benzidin or dianisidin) and 34.1 parts of 1.8-amidonaphthol-3.6-disulfonic acid, and then add a solution of thirty-eight parts of dioxy triazol mono sulfonic acid. The formation of the dyestuff begins at once and is finished after twelve hours. Then heat the whole to 80° centigrade, precipitate with common salt, filter, press, and dry. The resulting dyestuff is practically insoluble in alcohol, but easily dissolving in water to a blue solution which turns slightly red on adding soda-lye and from which a bluish-violet precipitate separates on adding hydrochloric acid, also dissolving in concentrated sulfuric acid to a pure-blue solution which falls down on adding water and dyeing unmordanted cotton a blue fast to washing. The same product is obtained by conjugating the tetrazo compound of the para diamin first with the dioxy triazol mono sulfonic acid and then combining the thus-formed intermediate product with the 1.8-amidonaphthol-3.6-disulfonic acid.

Now, what I claim, and desire to secure by Letters Patent, is the following:

1. As a new process the manufacture of blue tetrazo dyes of the general formula $$\text{Para diamin} \begin{cases} \text{Amido-naphthol-sulfonic acid} \\ \text{Di-oxy-triazol-sulfonic acid,} \end{cases}$$

consisting in the combination of an intermediate product from a para diamin and one molecule of an amido-naphthol-sulfonic acid with one molecule of a di-oxy-triazol-sulfonic acid, substantially as herein described.

2. As new articles of manufacture, the blue tetrazo dyestuffs herein described, deriving from one molecule of a para diamin, one molecule of 1: 8-amido-naphthol, 3: 6-di-sulfonic acid and one molecule of di-oxy-triazol-mono-sulfonic acid, being easily soluble in water and dyeing unmordanted cotton in blue shades.

3. As a new article of manufacture, the coloring-matter herein described of the formula:

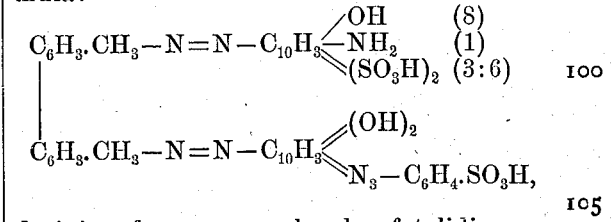

deriving from one molecule of tolidin, one molecule of 1:8-amido-naphthol, 3:6-disulfonic acid and one molecule of di-oxy-triazol-mono-sulfonic acid, which is in its dry state a brown-black powder with a metallic luster, practically insoluble in alcohol but easily dissolving in water to a blue solution which turns slightly red on adding soda-lye and from which a bluish-violet precipitate separates on adding hydrochloric acid, also dissolving in concentrated sulfuric acid to a pure-blue solution from which a bluish-violet precipitate falls down on adding water, and dyeing unmordanted cotton pure-blue shades fast to washing.

In testimony whereof I have signed my name to this specification in the presence of two subscribing witnesses.

JULIUS HERBABNY.

Witnesses:
RICHARD GUENTHER,
CARL GRUND.